(12) United States Patent
Moreno et al.

(10) Patent No.: US 11,854,533 B2
(45) Date of Patent: Dec. 26, 2023

(54) SPEAKER AWARENESS USING SPEAKER DEPENDENT SPEECH MODEL(S)

(71) Applicant: GOOGLE LLC, Mountain View, CA (US)

(72) Inventors: Ignacio Lopez Moreno, New York, NY (US); Quan Wang, Hoboken, NJ (US); Jason Pelecanos, New York, NY (US); Li Wan, New York, NY (US); Alexander Gruenstein, Mountain View, CA (US); Hakan Erdogan, Belmont, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/587,424

(22) Filed: Jan. 28, 2022

(65) Prior Publication Data
US 2022/0157298 A1   May 19, 2022

Related U.S. Application Data

(63) Continuation of application No. 17/251,163, filed as application No. PCT/US2019/064501 on Dec. 4, 2019, now Pat. No. 11,238,847.

(51) Int. Cl.
*G10L 15/16* (2006.01)
*G10L 15/06* (2013.01)
(Continued)

(52) U.S. Cl.
CPC ............ *G10L 15/063* (2013.01); *G10L 15/07* (2013.01); *G10L 15/20* (2013.01); *G10L 17/04* (2013.01);
(Continued)

(58) Field of Classification Search
None
See application file for complete search history.

(56) References Cited

U.S. PATENT DOCUMENTS

| 5,917,891 | A  | 6/1999 | Will |
| 6,253,181 | B1 | 6/2001 | Junqua |

(Continued)

FOREIGN PATENT DOCUMENTS

| JP | 2019514045 | 5/2019 |
| JP | 2019528476 | 10/2019 |

(Continued)

OTHER PUBLICATIONS

Intellectual Property India; First Examination Report issued in Application No. 202127058228; 8 pages; dated Jul. 6, 2022.
(Continued)

*Primary Examiner* — Jakieda R Jackson
(74) *Attorney, Agent, or Firm* — Gray Ice Higdon

(57) ABSTRACT

Techniques disclosed herein enable training and/or utilizing speaker dependent (SD) speech models which are personalizable to any user of a client device. Various implementations include personalizing a SD speech model for a target user by processing, using the SD speech model, a speaker embedding corresponding to the target user along with an instance of audio data. The SD speech model can be personalized for an additional target user by processing, using the SD speech model, an additional speaker embedding, corresponding to the additional target user, along with another instance of audio data. Additional or alternative implementations include training the SD speech model based on a speaker independent speech model using teacher student learning.

12 Claims, 8 Drawing Sheets

(51) Int. Cl.
  *G10L 15/07* (2013.01)
  *G10L 15/20* (2006.01)
  *G10L 17/04* (2013.01)
  *G10L 17/20* (2013.01)
  *G10L 21/0208* (2013.01)
  *G10L 15/08* (2006.01)

(52) U.S. Cl.
  CPC .......... *G10L 17/20* (2013.01); *G10L 21/0208* (2013.01); *G10L 2015/088* (2013.01)

(56) References Cited

U.S. PATENT DOCUMENTS

| | | | |
|---|---|---|---|
| 6,343,269 | B1 | 1/2002 | Harada |
| 6,389,393 | B1 | 5/2002 | Gong |
| 6,405,168 | B1 | 6/2002 | Bayya et al. |
| 8,571,859 | B1 | 10/2013 | Aleksic et al. |
| 9,786,270 | B2 | 10/2017 | Senior et al. |
| 9,837,072 | B2 | 12/2017 | Ljolje et al. |
| 10,115,393 | B1 | 10/2018 | Kumar et al. |
| 10,229,672 | B1 | 3/2019 | Rao et al. |
| 10,957,337 | B2 | 3/2021 | Chen et al. |
| 11,238,847 | B2 | 2/2022 | Moreno et al. |
| 2002/0103639 | A1 | 8/2002 | Chang et al. |
| 2002/0156626 | A1 | 10/2002 | Hutchison |
| 2003/0050780 | A1 | 3/2003 | Rigazio et al. |
| 2003/0220791 | A1 | 11/2003 | Toyama |
| 2005/0096906 | A1 | 5/2005 | Barzilay |
| 2007/0118364 | A1 | 5/2007 | Wise et al. |
| 2007/0118374 | A1 | 5/2007 | Wise et al. |
| 2008/0243500 | A1 | 10/2008 | Bisani et al. |
| 2009/0119103 | A1 | 5/2009 | Gerl et al. |
| 2009/0306981 | A1 | 12/2009 | Cromack et al. |
| 2014/0278397 | A1* | 9/2014 | Chen ............... G10L 21/02 704/233 |
| 2015/0149165 | A1 | 5/2015 | Saon |
| 2015/0287422 | A1 | 10/2015 | Short et al. |
| 2017/0160813 | A1 | 6/2017 | Divakaran et al. |
| 2017/0351486 | A1 | 12/2017 | Won et al. |
| 2019/0259378 | A1* | 8/2019 | Khadloya ............. G10L 25/21 |
| 2019/0272818 | A1 | 9/2019 | Fernandez et al. |
| 2019/0341057 | A1 | 11/2019 | Zhang |
| 2019/0355366 | A1 | 11/2019 | Ng et al. |
| 2020/0090657 | A1 | 3/2020 | Czarnowski et al. |
| 2020/0221223 | A1* | 7/2020 | Zhou ............... G10L 15/08 |
| 2020/0243094 | A1 | 7/2020 | Thomson et al. |
| 2020/0334538 | A1 | 10/2020 | Meng et al. |
| 2020/0335085 | A1 | 10/2020 | Meng et al. |
| 2020/0365166 | A1 | 11/2020 | Zhang et al. |
| 2021/0065683 | A1 | 3/2021 | Meng et al. |
| 2021/0118425 | A1 | 4/2021 | Pollet et al. |

FOREIGN PATENT DOCUMENTS

| | | |
|---|---|---|
| JP | 2019530888 | 10/2019 |
| KR | 101859708 | 5/2018 |

OTHER PUBLICATIONS

European Patent Office; Intention to Grant issued in Application No. 19828100.8; 7 pages; dated Aug. 11, 2021.
Yamada, M. et al. "Unsupervised Acoustic Model Adaptation Algorithm Using MLLR in a Noisy Environment;" Electronics & Communications in Japan, Part III—Fundamental Electronic Science; Wiley; vol. 89, No. 3, Part 03; pp. 48-58; Jan. 1, 2006.
European Patent Office; Invitation to Pay Additional Fees, PCT Ser. No. PCT/US2019/064501; 10 pages; dated Jul. 7, 2020.
European Patent Office; International Search Report and Written Opinion of PCT Ser. No. PCT/US2019/064501; 16 pages; dated Aug. 28, 2020.
Li, J. et al., "Large-Scale Domain Adaptation via Teacher-Student Learning;" Cornell University, arXiv.org, arXiv:1708.05466; 5 pages; Aug. 17, 2017.
Mosner, L. et al., "Improving NoiseRobustness of Automatic Speech Recognition via Parallel Data and Teacher-Student Learning;" Cornell University, arXiv.org, arXiv:1901.02348v3; 5 pages; Mar. 15, 2019.
European Patent Office; Intention to Grant issued in Application No. 19828100.8, 51 pages, dated Jan. 24, 2022.
European Patent Office; Extended European Search Report issued in Application No. 22181074.0, 11 pages, dated Oct. 10, 2022.
Ding, Shaojin, et al.; "Personal VAD: Speaker-Conditioned Voice Activity Detection," arxiv.org, Cornell University Library, XP081460222, dated Aug. 12, 2019.
Matsuda et al.; "Speaker-dependent Voice Activity Detection Robust to Background Speech Noise," Interspeech 2012, pp. 2626-2629, XP055945666, dated Jan. 1, 2012.
Toledo-Ronen, Orith,; Speech Detection for Text-Dependent Speaker Verification, XP007005201, dated 2001.
Japanese Patent Office; Notice of Reasons for Rejection issued in Application No. 2021574850; 10 pages; dated Mar. 13, 2023.
Zhong, M. et al., "Conditional Teacher-Student Learning", IEEE International Conference on Acoustic, Speech and Signal Processing, IEEE, 2019, 5 pages, Internet <URL: https://ieeexplore.ieee.org/document/8683438>; dated 2019.
Mosner, L. et al., Improving Noise Robustness of Automatic Speech Recognition Via Parallel Data and Teacher-Student Learning, International Conference on Acoustic, Speech and Signal Processing, IEEE, 2019; 5 pages; Internet <URL: https://ieeexplore.ieee.org/document/8683422>; dated 2019.
Tachiko, Y. et al., Voice Activity Detection Using DNN Adaptation with Auxiliary Speech Features, Information Processing Society of Japan, Journals, vol. 60 No. 4; Information Processing Society of Japan; 9 pages; dated 2019.

* cited by examiner

SPEAKER AWARENESS USING SPEAKER DEPENDENT SPEECH MODEL(S)

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

An automated assistant can convert audio data, corresponding to a spoken utterance of a user, into corresponding text (or other semantic representation). For example, audio data can be generated based on the detection of a spoken utterance of a user via one or more microphones of a client device that includes the automated assistant. The automated assistant can include a speech recognition engine that attempts to recognize various characteristics of the spoken utterance captured in the audio data, such as the sounds produced (e.g., phonemes) by the spoken utterance, the order of the pronounced sounds, rhythm of speech, intonation, etc. Further, the speech recognition engine can identify text words or phrases represented by such characteristics. The text can then be further processed by the automated assistant (e.g., using a natural language understanding engine and/or a dialog state engine) in determining responsive content for the spoken utterance. The speech recognition engine can be implemented by the client device and/or by one or more automated assistant component(s) that are remote from, but in network communication with, the client device.

SUMMARY

Techniques described herein are directed to training a speaker dependent (SD) speech model (SD speech model) based on a trained speaker independent (SI) speech model (SI speech model), where the SD speech model, once trained, is personalizable to any user. Techniques described herein are additionally or alternatively directed towards processing, using a trained SD speech model, audio data along with a speaker embedding for a target user to generate output that is personalized to the target user. The output is personalized to the target user in that it is reflective of only spoken utterance(s) of the target user (if any) included in the audio data. As one non-limiting example, if the trained SD speech model is a hotword detection model, the output will reflect whether the audio data includes a hotword that was spoken by the target user. Accordingly, if the audio data included only a hotword that was spoken by a different target user, the output would reflect that the audio data does not include a hotword that was spoken by the target user. On the other hand, if the audio data included a hotword that was spoken by the target user, the output would indicate that the audio data does include a hotword that was spoken by the target user. As described herein, the output generated using the trained SD speech model is personalized to the target user as a result of processing, using the trained SD speech model and along with audio data, the speaker embedding for the target user. Accordingly, a different speaker embedding for a different target user can be processed, using the same trained SD speech model (or a copy thereof) and along with the audio data, to generate different output that is personalized to the different target user. In these and other manners, the same SD speech model (or copies thereof) can be used and tailored to a corresponding one of any of a plurality of users through processing, along with corresponding audio data and using the SD speech model, a speaker embedding for the corresponding one of the users.

As one particular example, assume a first speaker embedding for Katherine, a second speaker embedding for Caleb, and audio data that captures spoken utterance(s) of Katherine but does not capture any spoken utterance(s) of Caleb. If a SD speech model is used to process: (a) audio data that captures spoken utterance(s) of Katherine but does not capture any spoken utterance(s) of Caleb and (b) the first speaker embedding (corresponding to Katherine), output will be generated that is personalized to Katherine. For instance, if the SD speech model is an automatic speech recognition (ASR) model, the output can indicate (directly or indirectly) recognized text for the spoken utterance(s) of Katherine (while not indicating any recognized text for utterance(s) of any other user(s) that may have been captured in the audio data). If, on the other hand, the SD speech model is used to process (a) audio data that captures spoken utterance(s) of Katherine but does not capture any spoken utterance(s) of Caleb and (b) the second speaker embedding (corresponding to Caleb), output will be generated that is personalized to Caleb. For instance, if the SD speech model is an ASR model, the output can indicate (directly or indirectly) no recognized text for the audio data (i.e., since the audio data does not capture any spoken utterance(s) of Caleb). As a continuation of the particular example, assume additional audio data that captures spoken utterance(s) of Caleb but does not capture any spoken utterance(s) of Katherine. If the additional audio data is processed using the SD speech model, along with the second speaker embedding (for Caleb), output will be generated that is personalized to Caleb. For instance, if the SD speech model is an ASR model, the output can indicate (directly or indirectly) recognized text for the spoken utterance(s) of Caleb (while not indicating any recognized text for utterance(s) of any other user(s) that may have been captured in the additional audio data). On the other hand, if the additional audio data is processed using the SD speech model, along with the first speaker embedding (for Katherine), output will be generated that is personalized to Katherine. For instance, if the SD speech model is an ASR model, the output can indicate (directly or indirectly) no recognized text for the audio data (i.e., since the additional audio data does not capture any spoken utterance(s) of Katherine).

In many of the training implementations, the SD speech model can be trained based on the SI speech model using teacher-student learning technique(s). In teacher-student learning, probabilities generated by a source-domain model (i.e., the SI speech model) can be used to train a target-domain model (i.e., the SD speech model). When training the SD speech model, the SI speech model can be used to process a clean instance of audio data capturing utterance(s) of a single target speaker to generate SI output. The SD speech model can be used to process a noisy instance of the audio data along with a speaker embedding corresponding to the target speaker to generate SD output, where the noisy instance of the audio data is generated by combining the instance of audio data capturing utterance(s) of the single target speaker with one or more additional sounds not from the target speaker (e.g., utterance(s) from one or more additional speakers, background noise(s), etc.). Accordingly, the SI output is generated based on processing, using the SI speech model, the clean instance of audio data and without processing any speaker embedding. On the other hand, the SD output is generated based on processing, using the SD speech model, the noisy instance of audio data and the speaker embedding. A loss can be determined based on the difference between the SI output and the SD output (e.g., a cross-entropy loss can be determined based on the SI output and the SD output). In many implementations, one or more portions of the SD speech model can be updated based on the determined loss. For example, the SD speech model can be updated based on the loss and optionally additional loss(es) (e.g., in batch training techniques). Through a large quantity of iterations with differing instances of audio data and differing speaker embeddings, the SD speech model can be trained to be personalizable to any target speaker.

In various implementations, the SI speech model can be frozen while training the SD speech model. In other words, the SI speech model is not updated based on the determined loss. In a variety of implementations, the SD speech model can have the same network topology as the SI speech model. Additionally or alternatively, the SD speech model can have a different network topology as the SI speech model, such as a smaller network topology. For example, the SD speech model can have fewer nodes thereby having a smaller memory footprint and/or the model has a smaller storage footprint. The smaller memory and/or storage footprint can enable client devices, that are often resource constrained, to utilize the trained SD speech model and/or to utilize less memory resources in utilizing the trained SD speech model.

In some implementations, the human speaker can be labeled in the audio data capturing utterance(s) of the human speaker. The speaker embedding can be determined by selecting the pre-calculated speaker embedding corresponding to the labeled speaker. For example, a pre-calculated speaker embedding corresponding to James can be selected for an instance of audio data labeled as capturing utterance(s) of James. Additionally or alternatively, a speaker embedding can be generated by processing portion(s) of the audio data (and/or other audio data known to be from the same speaker) using a speaker embedding model. In other words, the speaker embedding can be generated based on the instance of audio data itself, without the need for labeled audio data. This can enable training the SD speech model using unstructured data.

Techniques disclosed herein can be utilized with any of a variety of speech models including automatic speech recognition (ASR) models, voice activity detection (VAD) models, hotword detection models, speech enhancement models, and/or additional speech models. For instance, a speaker dependent VAD model (SD VAD model) can be trained based on a speaker independent VAD model (SI VAD model). Similarly, a speaker dependent hotword detection model can be trained based on a speaker independent hotword detection model.

In many implementations, a system can include multiple SD speech models. For example, a system can include a VAD model, a hotword detection model, and an ASR model, where output generated using the VAD model is used to determine whether to process audio data using the hotword detection model, and where output generated using the hotword detection model is used to determine whether to process audio data using the ASR model. In some implementations, all speech models in the system are SD speech models. For instance, the system can include a SD VAD model, a SD hotword detection model, and a SD ASR model. In some other implementations, some but not all speech models in the system are SD speech models. For instance, the system can include a SD VAD model, a SI hotword detection model, and a SI ASR model; the system can include a SD VAD model, a SD hotword detection model, and a SI ASR model; the system can include a SI VAD model, a SI hotword detection model, and a SD ASR model. Additional or alternative combinations of speaker dependent and/or speaker independent speech models can be utilized within a system in accordance with many implementations.

Accordingly, various implementations set forth techniques for training SD speech models based on SI speech models using teacher-student learning. Generating training instances in a fully supervised manner can be resource and/or labor intensive. For example, in generating a single training instance, relevant data (e.g., audio data capturing spoken utterance(s) of a single speaker) must be transmitted to a client device of a human reviewer, resources of the client device must be utilized to enable the reviewer to provide an annotation (e.g., labeling the single speaker in the instance of audio data), and the annotation must be transmitted back for training instance generation. Implementations disclosed herein utilize generating training instances using unstructured data (e.g., audio data without a corresponding label identifying the speaker), enabling systems to quickly generate training data corresponding to a wide number of distinct speakers—without transmission of data to client devices of reviewers and without utilizing resources of those client devices in obtaining reviewer provided annotations. Additionally or alternatively, a large number of training instances can be automatically generated from a variety of diverse resources, which can improve accuracy and/or robustness of output generated using an SD speech model trained on such training instances. In many implementations, a SD speech model can be trained using automatically generated training data. For example, a speaker embedding can be automatically generated based on portion(s) of an instance of audio data and a noisy instance of audio data can be automatically generated by spoken combining utterance(s) of the audio data with additional noise not from the speaker of the utterance(s) captured in the audio data.

Furthermore, a SD speech model can be personalizable for any target user through processing of a corresponding speaker embedding along with audio data, thereby generating output that is specific to the target user and the audio data. Accordingly, the output generated using the SD speech model will reflect only utterance(s) of the target user corresponding to the speaker embedding that is processed using the model (along with corresponding audio data). Thus, downstream process(es), that are only performed responsive to occurrence of certain output(s) generated using the SD speech model, will only be performed for utterance(s) that are from the target user. This can provide a reduction in the quantity of instances that such downstream process(es) are activated for users other than a target user, thereby conserving various resources utilized in performing such downstream process(es). For example, using a SD VAD model to process audio data along with an embedding for Sam can generate output (e.g., a probability or other measure that satisfies a threshold) that causes downstream processing of the audio data (e.g., ASR) when the audio data includes voice activity from Sam, while generating other output (e.g., a probability or other measure that fails to satisfy the threshold) that prevents further downstream processing of the audio data when the audio data includes voice activity from Dean (without any voice activity from Sam). In these and other manners, downstream speech model(s), such as an ASR model downstream from the SD VAD model, can be used in processing a smaller portion of audio data, thus conserving system resources (e.g., battery power, processor cycles, memory, etc.). As another example, using a SD speech model to process audio data along with an embedding for Sam can generate output can generate output that indicates (directly or indirectly) recognized text for utterance(s) of Sam when the audio data includes such spoken utterance(s), while generating output that indicates no recognized text when the audio data lacks any spoken utterance(s) of Sam (even though it may include spoken utterance(s) from another user). Accordingly, natural language understanding (NLU) model(s) that process the recognized text and/or fulfillment engine(s) that generate a response (and/or perform other responsive action) based on the recognized text and/or the NLU processing—will only be utilized when the SD speech model indicates recognized text (i.e., only when the audio data includes spoken utterance(s) from Sam). Thus, resources associated with the NLU processing and/or the fulfillment engine(s) will only be utilized when the SD speech model indicates recognized text (i.e., only when the audio data includes spoken utterance(s) from Sam). Additionally or alternatively, a SD speech model can have a smaller network topology than its corresponding SI speech model. A network with a smaller topology can have a smaller memory footprint and/or smaller storage footprint. Utilizing a speech model with a smaller network topology can provide technical benefits such as conservation of memory, storage, and/or power resources, which can be especially beneficial for client device(s) and/or other computing device(s) with limited resources.

The above description is provided as an overview of some implementations of the present disclosure. Further description of those implementations, and other implementations, are described in more detail below.

DETAILED DESCRIPTION

Figure 1A:
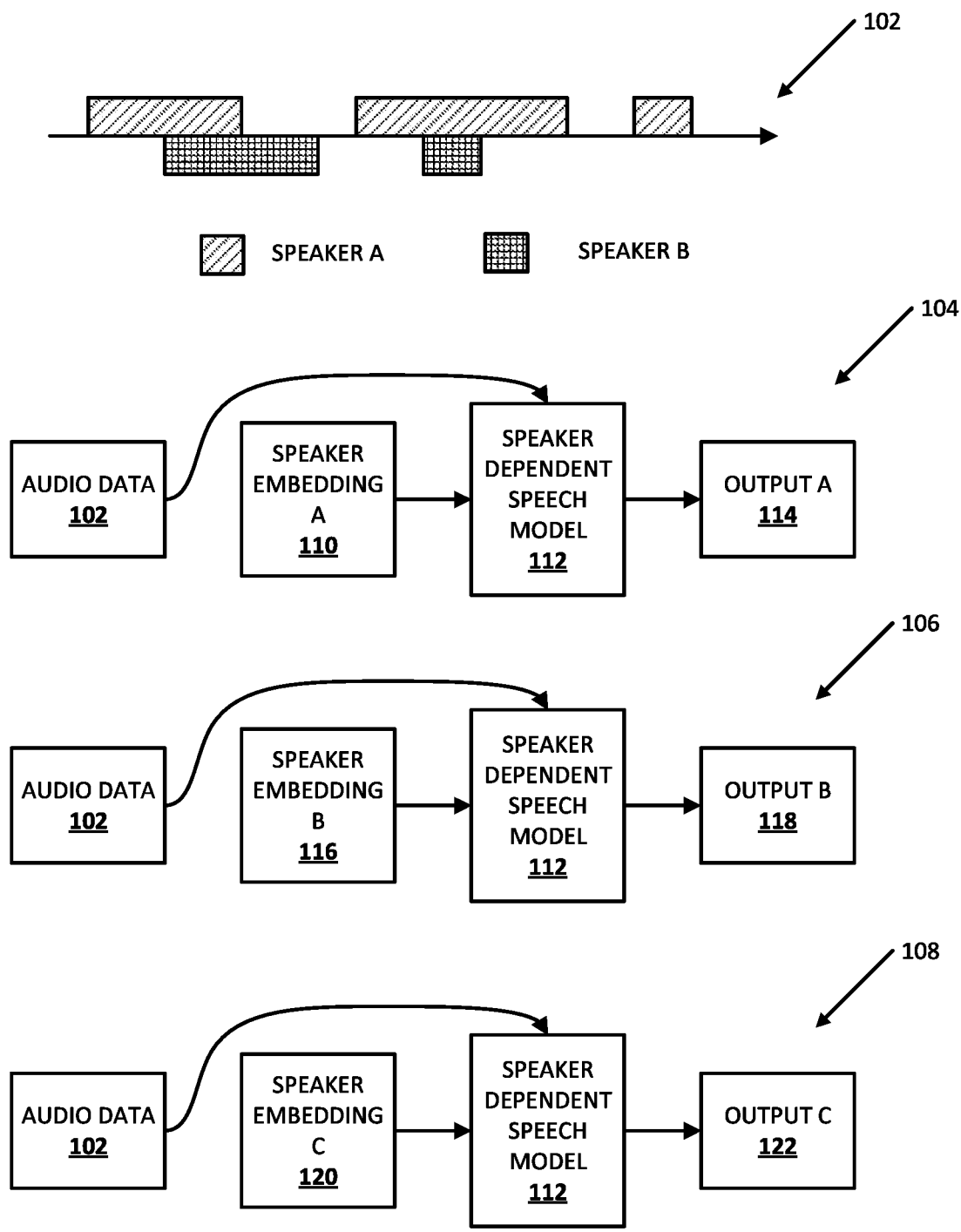
FIG. 1A illustrates examples of processing audio data and a speaker embedding using a speaker dependent speech model in accordance with various implementations disclosed herein.

Turning now to the figures, FIG. 1A illustrates examples of processing audio data along with several different speaker embeddings using a SD speech model in accordance with implementations disclosed herein. FIG. 1A includes audio data 102, which includes overlapping utterances by "Speaker A" and "Speaker B". The arrow in audio data 102 illustrates time, the three diagonal shading areas in audio data 102 represent segments of audio data where "Speaker A" is providing a respective utterance, and the two cross hatch shading areas in audio data 102 represent segments of audio data where "Speaker B" is providing a respective utterance. In the illustrated example, utterance(s) of "Speaker A" are overlapping at least in part with utterances(s) of "Speaker B". FIG. 1A further illustrates example 104 of processing audio data 102 and a speaker embedding A 110 corresponding to "Speaker A" using SD speech model 112 to generate output A 114. SD speech model 112 is personalizable to any user of a client device. In many implementations, a speaker embedding can be utilized to personalize SD speech model 112 for a distinct user. For example, speaker embedding A 110 can be used to personalize SD speech model 112 for "Speaker A". Utterance(s) of "Speaker A" are captured in audio data 102, therefore processing audio data 102 along with speaker embedding A 110 using SD speech model 112 can generate output A 114 providing an indication that audio data 102 includes utterance(s) of "Speaker A".

In many implementations, the same SD speech model can be personalized for additional and/or alternative speaker(s) by processing audio data along with additional and/or alternative speaker embedding(s). FIG. 1A illustrates another example 106 of processing audio data 102 along with speaker embedding B 116 corresponding to "Speaker B" using the SD speech model 112 to generate output B 118. Audio data 102 additionally captures utterance(s) of "Speaker B", therefore processing audio data 102 along with speaker embedding B 110 using SD speech model 112 can generate output B 118, where output B 118 provides an indication that audio data 102 includes utterance(s) of "Speaker B".

FIG. 1A also illustrates example 108 of processing audio data 102 along with a speaker embedding C 120 corresponding to "Speaker C" using SD speech model 112 to generate output C 122. In the illustrated example, no (or de minimus) utterances of "Speaker C" are captured in audio data 102. Therefore, output C 112 generated by processing audio data 102 along with speaker embedding C 120 using SD speech model 112 can provide an indication that no utterances of "Speaker C" are captured in audio data 102.

Although the examples in FIG. 1A are processing the same instance of audio data 102, additional and/or alternative instances of audio data can be processed in accordance with many implementations. Audio data can capture spoken utterance(s) from one or more additional and/or alternative speakers. For example, audio data can capture utterance(s) spoken by three users, four users, five users, etc. Audio data can additionally or alternatively capture background noise(s) not spoken by a user of a client device. For example, audio data can capture a dog barking, a telephone ringing, a smoke alarm beeping, and/or additional noise(s). Audio data 102 includes utterances of "Speaker A" overlapping at least in part with utterances of "Speaker B". However, this is merely an example, and audio data capturing non-overlapping utterance(s) of distinct speakers can be processed using a SD speech model.

A variety of types of speech models can be utilized in accordance with many implementations (e.g., a SD VAD model, a SD ASR model, a SD hotword model, a SD speech enhancement model, etc.). Processing audio data and a speaker embedding using a variety of types of SD speech models can generate a variety of types of output tailored to the type of SD speech model. For example, output generated using a SD VAD model can provide an indication of voice activity of a speaker corresponding to the processed speaker embedding is present in the processed audio data (in contrast to output generated using a SI VAD model which provides an indication of voice activity of any speaker of utterance(s) is processed audio data). An SD ASR model can be used in generating output providing a representation of text corresponding to utterance(s) spoken by the speaker corresponding to the processed speaker embedding (in contrast to output generated using a SI ASR model providing a text representation of any utterance(s) captured in processed audio data). Similarly, a SD hotword detection model can be used to generate output indicating whether a hotword spoken by a speaker corresponding to a processed speaker embedding is captured in processed audio data (in contrast to output of a SI hotword detection model providing an indication a hotword spoken by any user is captured in processed audio data). Moreover, a SD speech enhancement model can be used to generate enhanced speech corresponding to a processed speaker embedding (in contrast to a SI speech enhancement model which can be used to generate enhanced speech corresponding to any utterance(s) captured in processed audio data).

In some implementations, systems can include multiple speech models. For example, a system can include a VAD model, a hotword detection model, and an ASR model, where output generated using the VAD model is used to determine whether to process audio data using the hotword detection model, and where output generated using the hotword detection model is used to determine whether to process audio data using the ASR model. In some implementations, all speech models in a system are SD speech models. For instance, the system can include a SD VAD model, a SD hotword detection model, and a SD ASR model. In some other implementations, some but not all speech models in a system are SD speech models. For instance, the system can include a SD VAD model, a SI hotword detection model, and a SI ASR model; the system can include a SD VAD model, a SD hotword detection model, and a SI ASR model; the system can include a SI VAD model, a SI hotword detection model, and a SD ASR model. Additional or alternative combinations of speaker dependent and/or speaker independent speech models can be utilized within a system in accordance with many implementations.

Figure 1B:
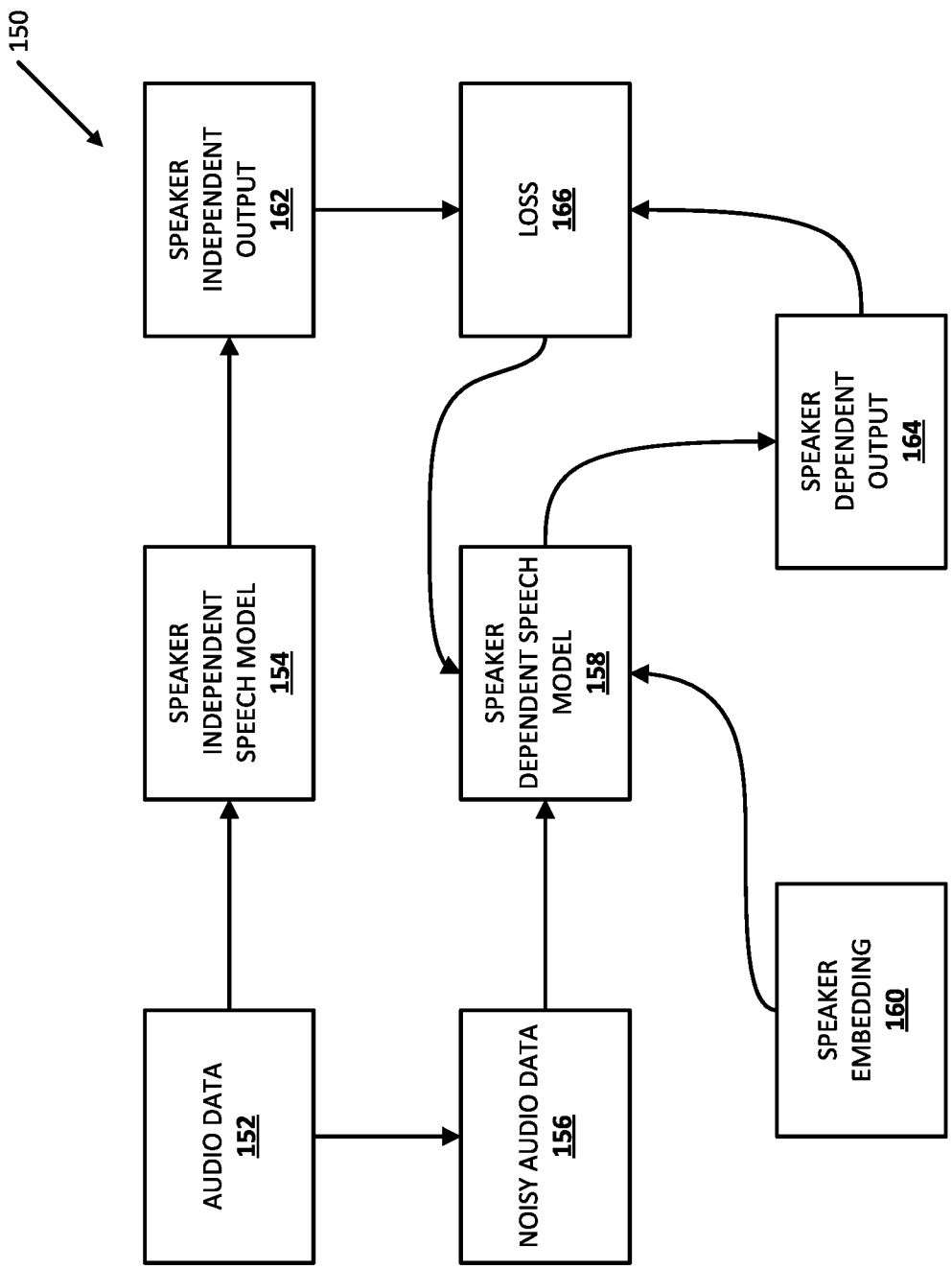
FIG. 1B illustrates an example of training a speaker dependent speech model based on a speaker independent speech model in accordance with various implementations disclosed herein.

FIG. 1B illustrates an example 150 of training SD speech model 158 based on SI speech model 154. In many implementations, teacher-student learning technique(s) can be utilized in training SD speech model 158 based on SI speech model 154. In many implementations, an instance of audio data 152 and a noisy instance of audio data 156 can be utilized in training SD speech model 158. Audio data 152 can capture spoken utterance(s) of a target speaker, without capturing any utterance(s) from a speaker who is not the target speaker (or capturing de minimus utterance(s) from a speaker who is not the target speaker) and/or without capture background noise (or capturing de minimus background noise). For example, audio data 152 can capture utterance(s) spoken by Molly and not capture utterance(s) from a speaker who is not Molly and/or not capture any background noise. Noisy audio data 156 can be generated by combining the utterance(s) spoken by the target user with additional noise not spoken by the target user. For example, noisy audio data 156 can be generated by combining utterance(s) spoken by Molly with utterance(s) spoken by Timmy.

Audio data 152 (i.e., audio data capturing only utterance(s) from Molly) can be processed using SI speech model 154 to generate SI output 162. Noisy audio data 156 (i.e., audio data capturing utterance(s) from Molly and utterance(s) from Timmy) can be processed along with speaker embedding 160 corresponding to Molly using SD speech model 158 to generate SD output 164. In some implementations, speaker embedding 160 can be determined based on a label indicating the speaker captured in audio data 152 (e.g., a label indicating audio data 152 captures utterance(s) spoken by Molly can be used to select a pre-calculated speaker embedding corresponding to Molly). In various implementations, speaker embedding 160 can be generated by processing one or more portions of audio data 152 using a speaker embedding model (not depicted). For example, the first 0.5 seconds of audio data 152, the first 1.5 seconds of audio data 152, the last 2 seconds of audio data 152, the first second and the last second of audio data 152, the entirety of audio data 152, and/or additional portion(s) of audio data 152 can be processed using the speaker embedding model to generate speaker embedding 160. In many implementations, speaker embedding 160 can be a d-vector, an i-vector, and/or additional representation(s) of a speaker of audio data.

In many implementations, a loss can be generated based on SI output 162 and SD output 164. For example, a cross-entropy loss can be generated based on SI output 162 and SD output 164. In several implementations, a variety losses can be generated including: a maximum likelihood loss, a mean squared error loss, and/or additional or alternative loss(es). One or more portions of SD speech model 158 can be updated based on loss 166 (e.g., updated using backpropagation). In a variety of implementations, SI speech model 154 can be frozen while training SD speech model 158. In other words, no portions of SI speech model 154 are updated based on loss 166. In many implementations, SD speech model 158 can have the same network topology as SI speech model 154. However, additional and/or alternative implementations can include a SD speech model 158 with a different network topology from SI speech model 154. For example, SD speech model 158 can have a smaller network topology such that SD speech model 158 has fewer nodes than SI speech model 154 and thereby SD speech model 158 has a smaller memory footprint and/or smaller storage footprint than SI speech model 154.

Figure 2:
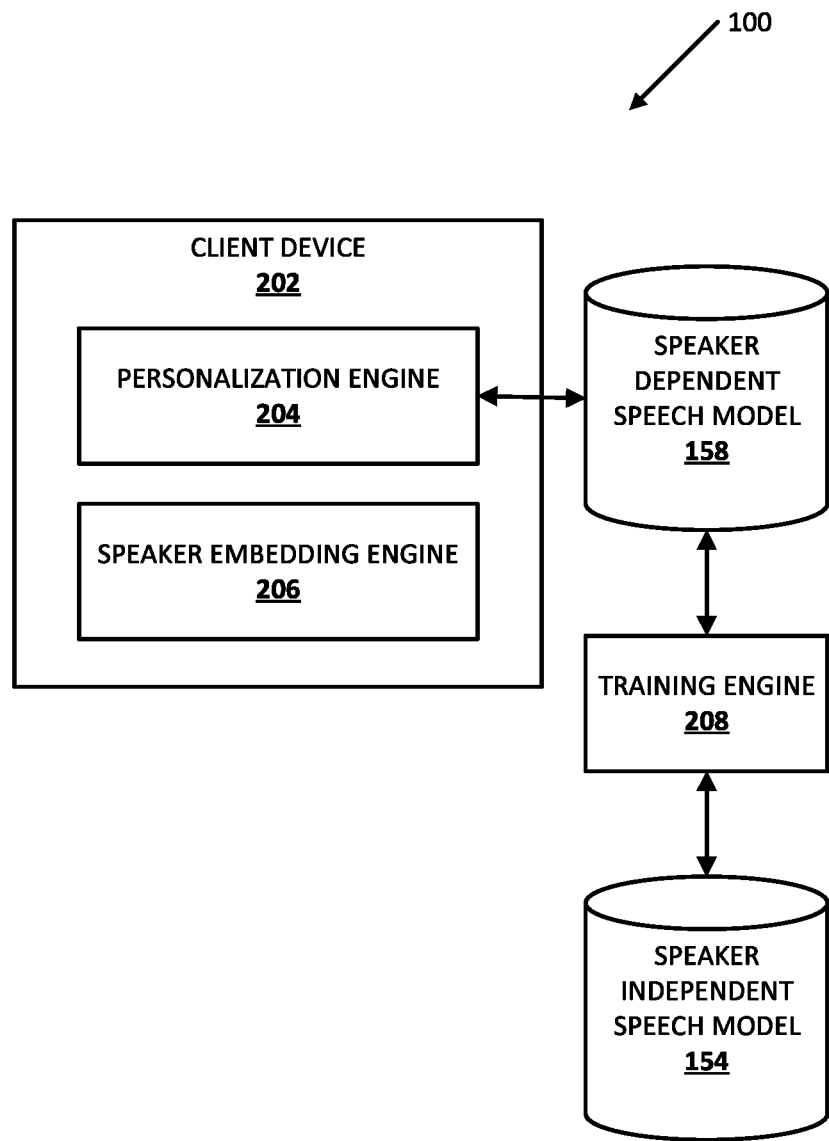
FIG. 2 is a block diagram illustrating an example environment in which various implementations can be implemented.

Turning to FIG. 2, an example environment is illustrated in which various implementations can be implemented. FIG. 2 includes a client computing device 202. In many implementations, client device 202 can execute an instance of an automated assistant (not depicted). The client computing device 202 may be, for example: a desktop computing device, a laptop computing device, a tablet computing device, a mobile phone computing device, a computing device of a vehicle of the user (e.g., an in-vehicle communications system, and in-vehicle entertainment system, an in-vehicle navigation system), a standalone interactive speaker, a smart appliance such as a smart television, and/or a wearable apparatus of a user that includes a computing device (e.g., a watch of the user having a computing device, glasses of the user having a computing device, a virtual or augmented reality computing device). Additional and/or alternative client computing devices may be provided.

The example environment illustrated in FIG. 2 includes personalization engine 204, speaker embedding engine 206, training engine 208, SD speech model 158, SI speech model 154, and/or additional engine(s) and/or additional model(s)

(not depicted). Personalization engine 204, speaker embedding engine 206, and training engine 208 are example components in which techniques described herein my interface. The operations performed by one or more engines 204, 206, and 208 of FIG. 2 may be distributed across multiple computing systems. In some aspects, one or more aspects of engines 204, 206, and 208 and/or models 158 and 154 may be combined into a single system and/or one or more aspects may be implemented on the client device 202. For example, in some of those implementations, aspects of personalization engine 204 may be combined with aspects of speaker embedding engine 206. Engines in accordance with many implementations may each be implemented in one or more computing devices that communicate, for example, through a communication network. A communication network may include a wide area network such as the Internet one or more local area networks ("LAN"s) such as Wi-Fi LANs, mesh networks, etc., and/or one or more bus subsystems. A communication network may optionally utilize one or more standard communication technologies, protocols, and/or inter-process communication techniques.

Training engine 208 can train SD speech model 158 based on SI speech model 154. In many implementations, training engine 208 can utilize teacher-student learning technique(s) to train SD speech model 158 based on SI speech model 154. For example, training engine 208 can select one or more training instances (not depicted), and process the training instance(s) using SD speech model 158 and SI speech model 154. In many implementations, a training instance can include (1) a clean instance of audio data capturing spoken utterance(s) of a target speaker, (2) a noisy instance of the audio data capturing spoken utterance(s) of the target speaker as well as noise(s) not spoken by the target speaker, and (3) a speaker embedding corresponding to the target speaker. Training engine 208 can process the clean instance of audio data capturing spoken utterances of the target speaker using SI speech model 154 to generate SI output. Additionally, training engine 208 can process the noisy instance of audio data along with the speaker embedding using SD speech model 158 to generate SD output. In many implementations, training engine 208 can generate a loss based on a difference between the SD output and the SI output (e.g., a cross entropy loss) and update one or more portions of SD speech model 158 based on the generated loss. In other words, portion(s) of SD speech model 158 are updated while SI speech model 154 are frozen. In a variety of implementations, training instance(s) can be generated using a training instance engine (not depicted) in accordance with process 300 of FIG. 3. In several implementations, training engine 208 can train SD speech model 158 in accordance with process 400 of FIG. 4.

Personalization engine 204 can process audio data, such as audio data captured using microphone(s) of client device 202 (not depicted), along with a speaker embedding using SD speech model 158 to generate speaker dependent output. In many implementations, the speaker embedding can be selected using speaker embedding engine 206. For example, speaker embedding engine 206 can select a speaker embedding of a user profile associated with client device 202. In a variety of implementations, the speaker embedding can be pre-calculated during an enrollment of the user with a digital system (e.g., enrollment with client device 202 and/or enrollment with an additional digital system).

Figure 3:
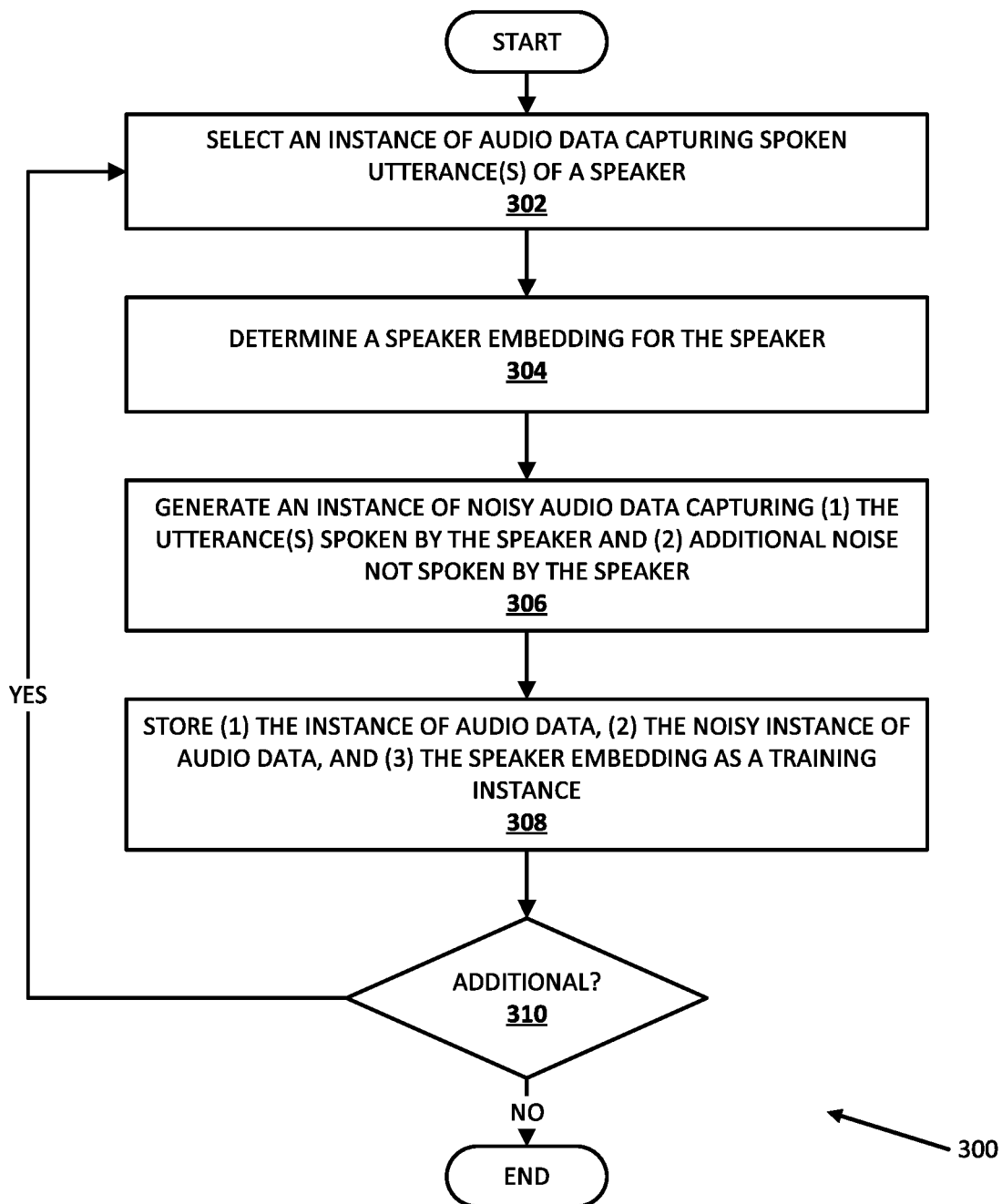
FIG. 3 is a flowchart illustrating an example process in accordance with implementations disclosed herein.

Turning now to FIG. 3, a flowchart is provided that illustrates a process 300 of generating training instance(s) for use in training a SD speech model based on a SI speech model according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 300 are shown in a particular order, this is not meant to be limiting. One or more operations may be reordered, omitted, and/or added.

At block 302, the system selects an instance of audio data capturing spoken utterance(s) of a speaker. In many implementations, the selected instance of audio data captures no (or de minimus) additional noise not from the speaker.

At block 304, the system determines a speaker embedding for the speaker. In some implementations, the instance of audio data can be labeled with the speaker, and the system can select a pre-calculated speaker embedding based on the label. In many implementations, the system can generate the speaker embedding by processing portion(s) of the instance of audio data using a speaker embedding model. This can allow the system to generate training instance(s) using unstructured data where the identity of the speaker is not known.

At block 306, the system generates an instance of noisy audio data capturing (1) the utterance(s) spoken by the speaker and (2) additional noise not spoken by the speaker. In many implementations, the system can generate the noisy instance of the audio data by combining the instance of audio data selected at block 302 with one or more utterances spoken by one or more additional speakers who are not the speaker of the utterance(s) in the instance of audio data. In many implementations, the system can generate the noisy instance of audio data by combining the instance of audio data selected at block 302 with background noise(s) (i.e., noises not spoken by any speaker). Additionally or alternatively, the system can generate the noisy instance of audio data by combining utterance(s) spoken by additional speaker(s) as well as background noise(s) with the utterance(s) in instance of audio data.

At block 308, the system stores (1) the instance of audio data, (2) the noisy instance of audio data, and (3) the speaker embedding as a training instance.

At block 310, the system determines whether to generate additional training instance(s). If so, the system proceeds back to block 302 and selects an additional instance of audio data capturing spoken utterance(s) of a single speaker before proceeding to blocks 304, 306, and 308 using the additional instance of audio data. In some implementations, the speaker of utterance(s) is the additional instance of audio data is the same speaker of utterance(s) in the audio data. In some implementations, the speaker of utterance(s) in the additional instance of audio data is not the same speaker of utterance(s) in the instance of audio data. If at block 310, the system determines to not generate any additional training instances, the process ends.

Figure 4:
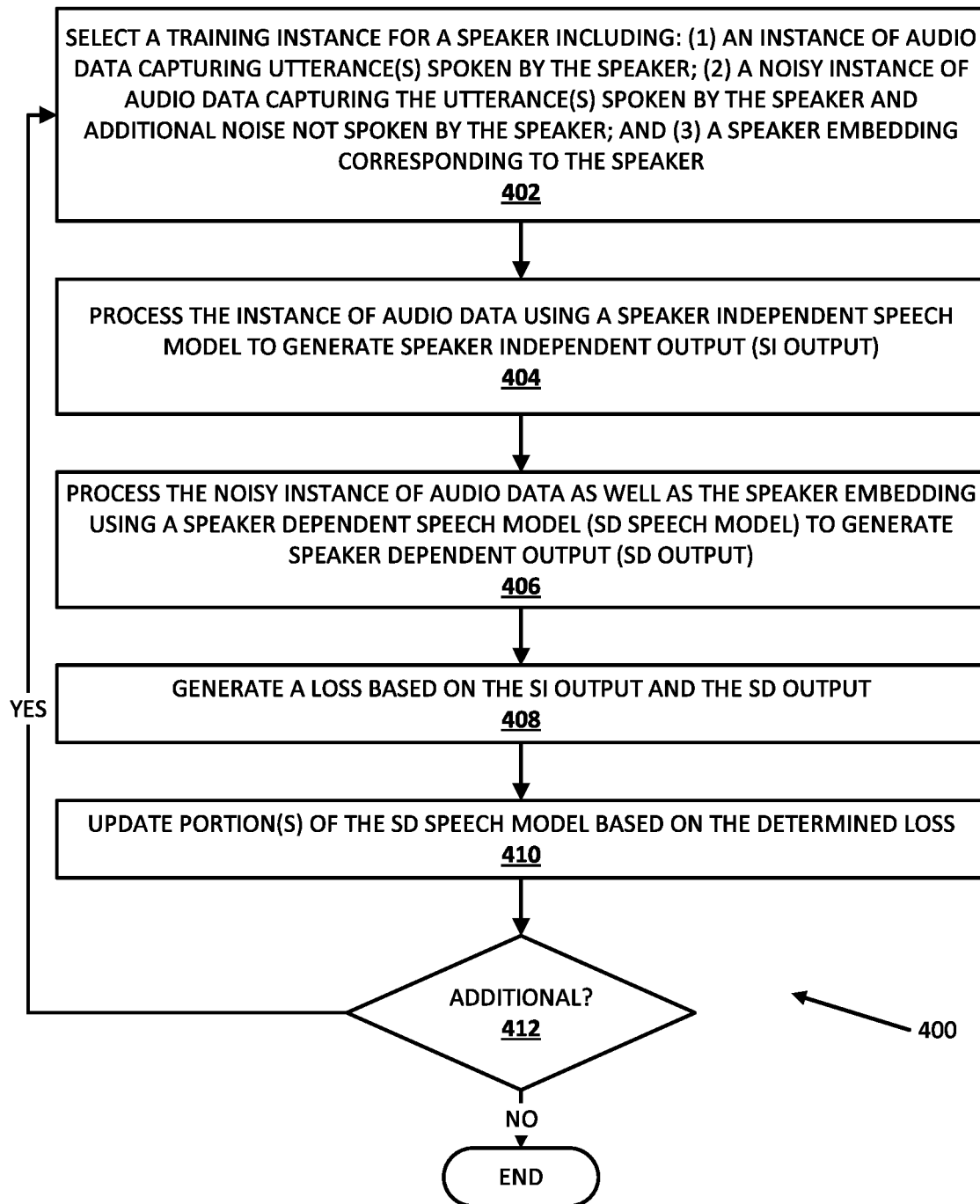
FIG. 4 is another flowchart illustrating another example process in accordance with implementations disclosed herein.

Turning now to FIG. 4, a flowchart is provided that illustrates a process 400 of training a SD speech model according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 400 are shown in a particular order, this is not meant to be limiting. One or more operations may be reordered, omitted, and/or added.

At block 402, the system selects a training instance for a speaker including: (1) an instance of audio data capturing utterance(s) spoken by the speaker; (2) a noisy instance of audio data capturing the utterance(s) spoken by the speaker and additional noise not spoken by the speaker; and (3) a speaker embedding corresponding to the speaker. In many implementations, training instance(s) can be generated in accordance with process 300 of FIG. 3 described herein.

At block 404, the system processes the instance of audio data using a SI speech model to generate SI output.

At block 406, the system processes the noisy instance of audio data as well as the speaker embedding using a SD speech model to generate SD output.

At block 408, the system generates a loss based on the SI output and the SD output. In many implementations, the system can generate a cross-entropy loss.

At block 410, the system updates one or more portions of the SD speech model based on the determined loss. For example, the system can utilize backpropagation to update portion(s) of the SD speech model based on the determined loss. In many implementations, the determined loss is used to update portion(s) of only the SD speech model and is not used to update portion(s) of the SI speech model. In other words, the SI speech model is frozen during training of the SD speech model.

At block 412, the system determines whether to perform additional training. If so, the system proceeds back to block 402, selects an additional training instance, ben performs an iteration of blocks 404, 406, 408, and 410 based on the additional training instance, and then performs an additional iteration of block 412. In some implementations, the system can determine to perform more if there are one or more additional unprocessed training instances and/or if other criterion/criteria are not yet satisfied. The other criterion/criteria can include, for example, whether a threshold number of epochs have occurred and/or a threshold duration of training has occurred. Although process 400 is described with respect to a non-batch learning technique, batch learning may additionally and/or alternatively be utilized. If, at block 412, the system determines to not perform additional training, the process ends.

Figure 5:
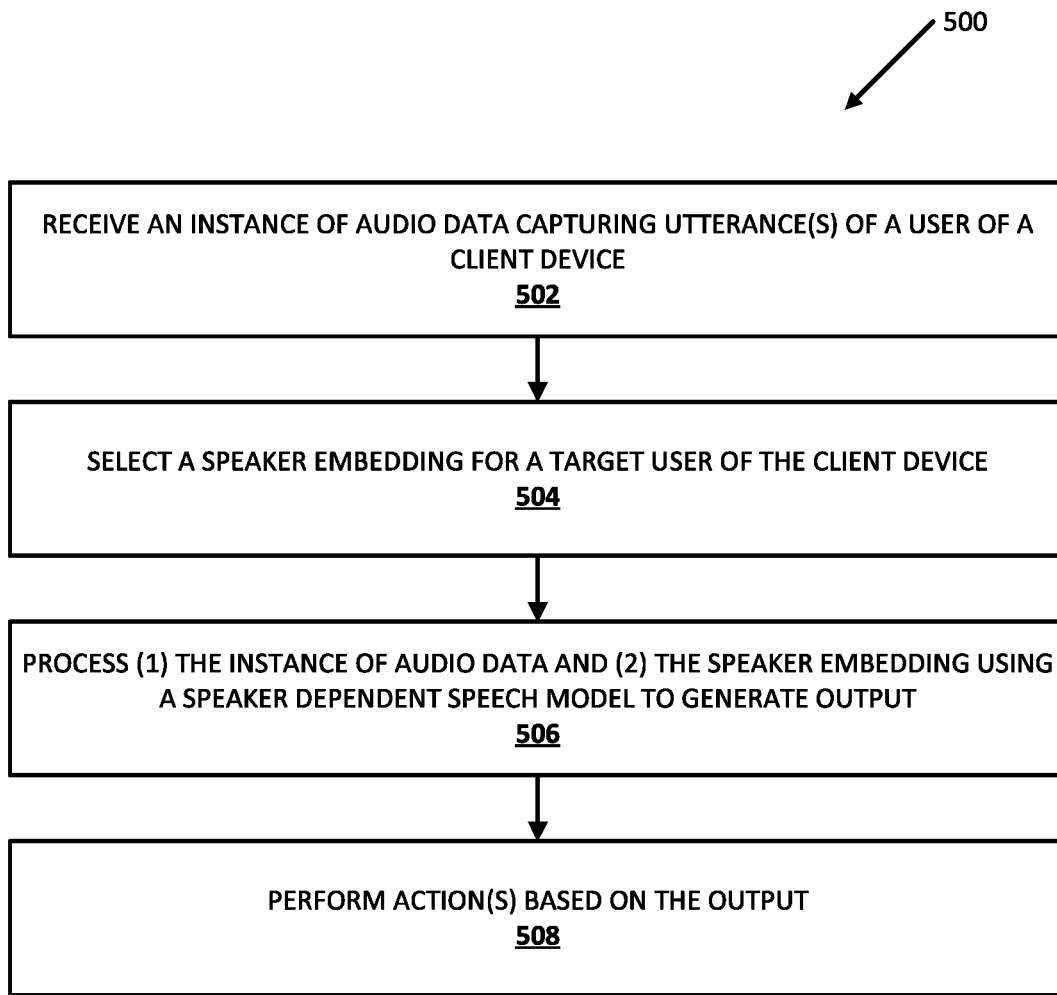
FIG. 5 is another flowchart illustrating another example process in accordance with implementations disclosed herein.

Turning now to FIG. 5, a flowchart is provided that illustrates a process 500 of processing captured audio data along with a speaker embedding using a SD speech model to generate output, and performing action(s) based on the output according to various implementations disclosed herein. For convenience, the operations of the flowchart are described with reference to a system that performs the operations. This system may include one or more components, such as one or more processors (e.g., CPU(s), GPU(s), and/or TPU(s)). While operations of process 500 are shown in a particular order, this is not meant to be limiting. One or more operations may be reordered, omitted, and/or added.

At block 502, the system receives an instance of audio data capturing spoken utterance(s) of a user of a client device. In some implementations, the instance of audio data captures spoken utterance(s) of user with no (or de minimus) additional noise not spoken by the user. Additionally or alternatively, the instance of audio data can capture the spoken utterance(s) of the user along with additional noise(s). For example, the instance of audio data can capture utterance(s) spoken by one or more additional speakers and/or background noise(s) in addition to the utterance(s) spoken by the user.

At block 504, the system selects a speaker embedding for a target user of the client device. In many implementations, a speaker embedding can be selected after audio data is captured at a client device of the user associated with the speaker embedding. Additionally or alternatively, the speaker embedding can be selected based on verification of a given user (e.g., using voice fingerprinting from earlier utterance(s) and/or other biometric verification(s)). In a variety of implementations, the speaker embedding can be generated during an enrollment of a user with a digital system (e.g., an enrollment of a user with an automated assistant). In many implementations, a client device can be associated with a single speaker embedding (e.g., the speaker embedding corresponding to the owner of the client device). For example, a mobile phone can store the speaker embedding associated with the owner of the mobile phone. Additionally or alternatively, a client device can be associated with multiple speaker embeddings, and the system can select a speaker embedding based on a determined currently active user. In many implementations, the currently active user can be determined based on facial recognition, voice recognition, and/or additional biometric recognition technique(s).

At block 506, the system processes (1) the instance of audio data and (2) the speaker embedding using a SD speech model to generate output. In many implementations, the output can indicate the audio data captures utterance(s) spoken by the speaker corresponding to the speaker embedding. Additionally or alternatively, the output can indicate the audio data does not capture utterance(s) spoken by the speaker corresponding to the speaker embedding. As an example, user John can have a multiple dialog session with an assistant. The system can determine John is an active user based on an invocation phrase spoken by John, which can cause the system to select the speaker embedding associated with John at block 504. If Bob begins speaking to John during the dialog session when John is not speaking, the system can process the audio data capturing utterances spoken by Bob along with the speaker embedding corresponding to John (the active user) using, for example, a SD VAD model to generate output indicating John did not speak the portion(s) of audio data capturing utterance(s) spoken by Bob.

At block 508, the system performs one or more actions based on the output. For instance, the SD speech model at block 506 can be a SD VAD model, where the generated output provides an indication whether voice activity (i.e., spoken utterance(s)) by the target speaker are captured in the audio data. In contrast, a SI VAD model can be used in generating output indicating whether voice activity (i.e., spoken utterance(s)) of any speaker are captured in the audio data. When the output generated at block 506 using the SD VAD model indicates the audio data captures utterance(s) spoken by the target user, the audio data and/or portion(s) of the audio data capturing utterance(s) spoken by the target user can be processed using additional and/or alternative speech model downstream from the SD VAD model (e.g., a hotword detection model downstream from the SD VAD model, an ASR model downstream from the SD VAD model, etc.). In some implementations, when the output generated using the SD speech model at block 506 indicates the audio data does not capture utterances spoken by the target user, the system can proceed back to block 504 to select an additional speaker embedding for an additional target user and process the instance of audio data and the additional speaker embedding using the SD speech model at block 506. Additionally or alternatively, the system can include multiple instances of the SD speech model, and can process the audio data along with multiple speaker embeddings using the SD speech model in parallel (e.g., the system can process the audio data with speaker embedding A using a first instance of the SD speech model in parallel with the system processing the audio data with speaker embedding B using a second instance of the SD speech model). In a variety of implementations, when the output generated using the SD speech model at block 506 indicates the audio data does not capture utterances spoken by the target user, the system can wait for further audio data.

Additionally or alternatively, the SD speech model at block 506 can be a SD hotword detection model, where the generated output provides an indication whether the audio data captures one or more hotwords spoken by the target user. In contrast, output generated using a SI hotword detection model can provide an indication whether audio data captures one or more hotwords spoken by any user. When the output generated at block 506 using the SD hotword detection model indicates the audio data captures hotword(s) spoken by the target user, the audio data and/or portions of the audio data capturing utterance(s) spoken by the target user can be processed using an additional and/or alternative speech model downstream from the SD hotword detection model (e.g., a VAD model downstream from the SD hotword detection model, an ASR model downstream from the SD hotword detection model, etc.). In some implementations, when the output generated using the SD hotword detection model at block 506 indicates he audio data does not capture hotword(s) spoken by the target user, the system can proceed, back to block 504 to select an additional speaker embedding for an additional target user and process the instance of audio data and the additional speaker embedding using the SD speech model at block 506. In a variety of implementations, when the output generated using the SD hotword detection model at block 506 indicates the audio data does not capture hotword(s) spoken by the target user, the system can wait for further audio data.

Furthermore, the SD speech model at block 506 can be a SD ASR model, where the generated output provides a text representation capturing utterance(s) spoken by the target user and excludes utterance(s) spoken by a user who is not the target user. In contrast, a SI ASR model can be used in generating a text representation of utterance(s) of any speaker captured in the audio data. When the output generated at block 506 using the SD ASR model indicates the audio data captures utterance(s) spoken by the target user (e.g., the output includes a text representation of spoken utterance(s)), the text representation can be used by the system to perform action(s). For example, the target user can speak "turn off the living room lights" which can be converted into a text representation using the SD ASR model. The text representation can be processed by additional portion(s) of the system to control one or more networked smart light bulbs located in the living room. In some implementations, when the output generated using the SD ASR model at block 506 indicates the audio data does not capture utterances spoken by the target user (e.g., the output lacks any text representations of spoken utterances and is empty, null, etc.), the system can proceed back to block 504 and select an additional speaker embedding for an additional target user and process the instance of audio data and the additional speaker embedding suing the SD speech model at block 506. In a variety of implementations, when the output generated using the SD ASR model at block 506 indicates the audio data does not capture utterances spoken by the target user, the system can wait for further audio data.

Figure 6:
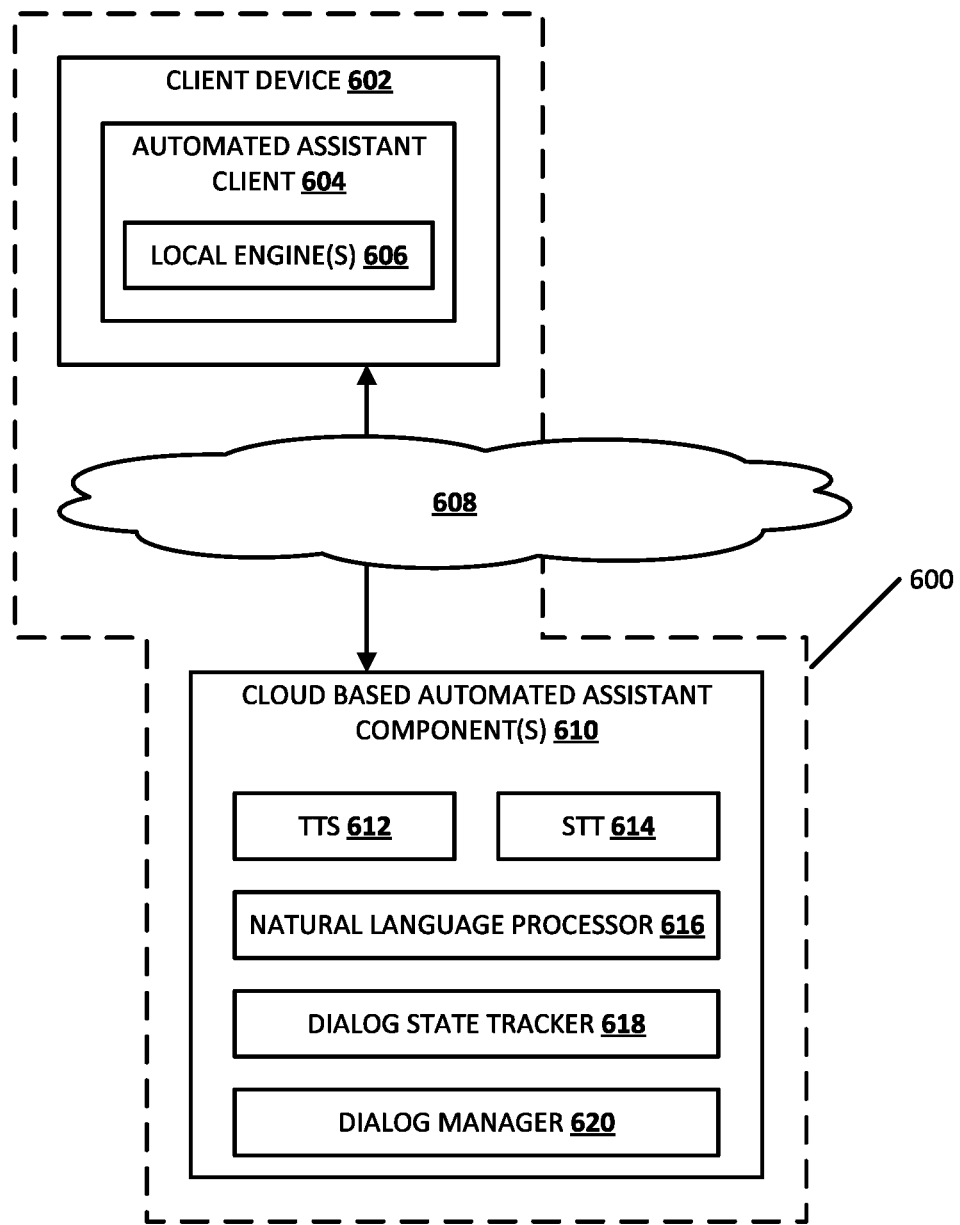
FIG. 6 is another block diagram illustrating yet another example environment in which various implementations can be implemented.

Turning now to FIG. 6, an example environment is illustrated where various implementations can be performed. FIG. 6 is described initially, and includes a client computing device 602, which executes an instance of an automated assistant client 604. One or more cloud-based automated assistant components 610 can be implemented on one or more computing systems (collectively referred to as a "cloud" computing system) that are communicatively coupled to client device 602 via one or more local and/or wide area networks (e.g., the Internet) indicated generally at 608.

An instance of an automated assistant client 604, by way of its interactions with one or more cloud-based automated assistant components 610, may form what appears to be, from the user's perspective, a logical instance of an automated assistant 600 with which the user may engage in a human-to-computer dialog. An instance of such an automated assistant 600 is depicted in FIG. 6. It thus should be understood that in some implementations, a user that engages with an automated assistant client 604 executing on client device 602 may, in effect, engage with his or her own logical instance of an automated assistant 600. For the sakes of brevity and simplicity, the term "automated assistant" as used herein as "serving" a particular user will often refer to the combination of an automated assistant client 604 executing on a client device 602 operated by the user and one or more cloud-based automated assistant components 610 (which may be shared amongst multiple automated assistant clients of multiple client computing devices). It should also be understood that in some implementations, automated assistant 600 may respond to a request from any user regardless of whether the user is actually "served" by that particular instance of automated assistant 600.

The client computing device 602 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 602 may optionally operate one or more other applications that are in addition to automated assistant client 604, such as a message exchange client (e.g., SMS, MMS, online chat), a browser, and so forth. In some of those various implementations, one or more of the other applications can optionally interface (e.g., via an application programming interface) with the automated assistant 600, or include their own instance of an automated assistant application (that may also interface with the cloud-based automated assistant component(s) 610).

Automated assistant 600 engages in human-to-computer dialog sessions with a user via user interface input and output devices of the client device 602. To preserve user privacy and/or to conserve resources, in many situations a user must often explicitly invoke the automated assistant 600 before the automated assistant will fully process a spoken utterance. The explicit invocation of the automated assistant 600 can occur in response to certain user interface input received at the client device 602. For example, user interface inputs that can invoke the automated assistant 600 via the client device 602 can optionally include actuations of a hardware and/or virtual button of the client device 602. Moreover, the automated assistant client can include one or more local engines 606, such as an invocation engine that is operable to detect the presence of one or more spoken invocation phrases. The invocation engine can invoke the automated assistant 600 in response to detection of one of the spoken invocation phrases. For example, the invocation engine can invoke the automated assistant 600 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 600. As used herein, "invoking" the automated assistant 600 can include causing one or more previously inactive functions of the automated assistant 600 to be activated. For example, invoking the automated assistant 600 can include causing one or more local engines 606 and/or cloud-based automated assistant components 610 to further process audio data frames based on which the invocation phrase was detected, and/or one or more following audio data frames (whereas prior to invoking no further processing of audio data frames was occurring). For instance, local and/or cloud-based components can process captured audio data suing a SD speech model in response to invocation of the automated assistant 600.

The one or more local engine(s) 606 of automated assistant 600 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 602 is relatively constrained in terms of computing resources (e.g., processor cycles, memory, battery, etc.), the local engines 606 may have limited functionality relative to any counterparts that are included in cloud-based automated assistant components 610.

Cloud-based automated assistant components 610 leverage the virtually limitless resources of the cloud to perform more robust and/or more accurate processing of audio data, and/or other user interface input, relative to any counterparts of the local engine(s) 606. Again, in various implementations, the client device 602 can provide audio data and/or other data to the cloud-based automated assistant components 610 in response to the invocation engine detecting a spoken invocation phrase, or detecting some other explicit invocation of the automated assistant 600.

The illustrated cloud-based automated assistant components 610 include a cloud-based TTS module 612, a cloud-based STT module 614, a natural language processor 616, a dialog state tracker 618, and a dialog manager 620. In some implementations, one or more of the engines and/or modules of automated assistant 600 may be omitted, combined, and/or implemented in a component that is separate from automated assistant 600. Further, in some implementations automated assistant 600 can include additional and/or alternative engines and/or modules. Cloud-based STT module 614 can convert audio data into text, which may then be provided to natural language processor 616.

Cloud-based TTS module 612 can convert textual data (e.g., natural language responses formulated by automated assistant 600) into computer-generated speech output. In some implementations, TTS module 612 may provide the computer-generated speech output to client device 602 to be output directly, e.g., using one or more speakers. In other implementations, textual data (e.g., natural language responses) generated by automated assistant 600 may be provided to one of the local engine(s) 606, which may then convert the textual data into computer-generated speech that is output locally.

Natural language processor 616 of automated assistant 600 processes free form natural language input and generates, based on the natural language input, annotated output for use by one or more other components of the automated assistant 600. For example, the natural language processor 616 can process natural language free-form input that is textual input that is a conversion, by STT module 614, of audio data provided by a user via client device 602. The generated annotated output may include one or more annotations of the natural language input and optionally one or more (e.g., all) of the terms of the natural language input.

In some implementations, the natural language processor 616 is configured to identify and annotate various types of grammatical information in natural language input. In some implementations, the natural language processor 616 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 616 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 616 may rely on annotations from one or more other components of the natural language processor 616. In some implementations, in processing a particular natural language input, one or more components of the natural language processor 616 may use related prior input and/or other related data outside of the particular natural language input to determine one or more annotations.

In some implementations, dialog state tracker 618 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 620 may be configured to map a current dialog state, e.g., provided by dialog state tracker 618, to one or more "responsive actions" of a plurality of candidate responsive actions that are then performed by automated assistant 600. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 600 outputting additional natural language dialog. This responsive dialog may include, for instance, requests that the user provide parameters for some action (i.e., fill slots) that dialog state tracker 618 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 7:
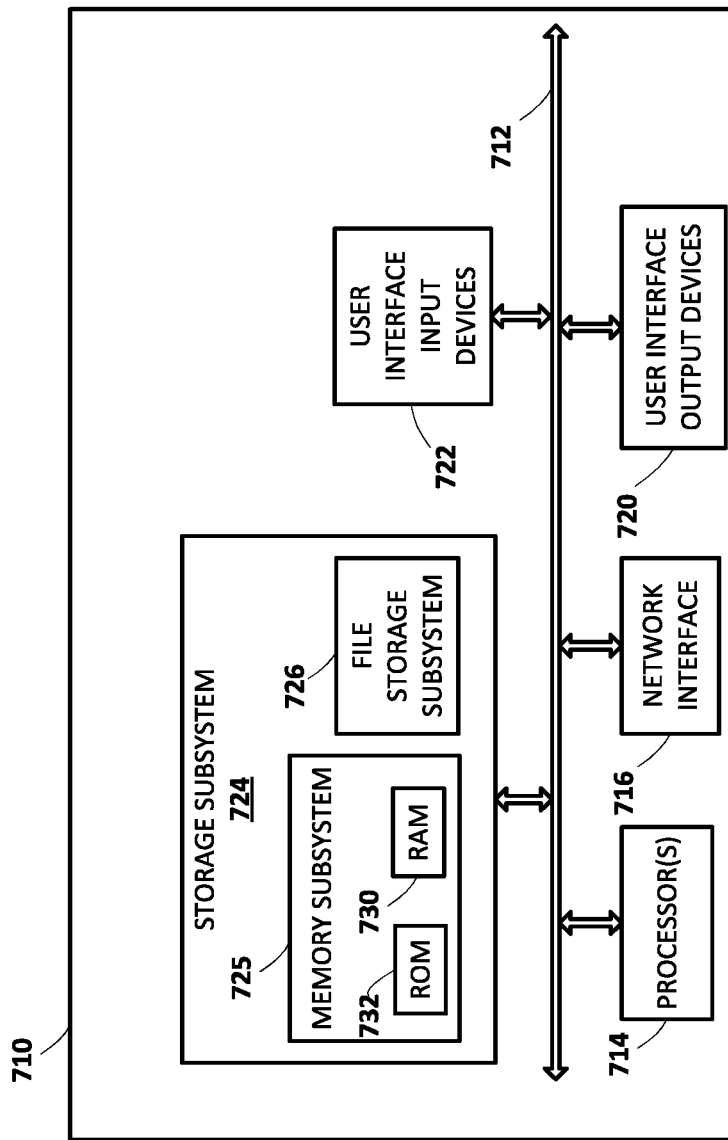
FIG. 7 is a block diagram illustrating an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 3, FIG. 4, and/or FIG. 5, as well as to implement various components depicted in FIG. 2 and/or FIG. 6.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is provided that includes training a speaker dependent speech model (SD speech model) based on a trained speaker independent speech model (SI speech model). The SD speech model is personalizable to any user of a corresponding client device. Training the SD speech model includes identifying an instance of audio data that captures one or more spoken utterances of a target user and determining a speaker embedding for the target user. Training the SD speech model further includes generating a noisy instance of audio data by combining the instance of audio data with one or more additional sounds that are not from the target user. Training the SD speech model further includes processing the instance of audio data using the SI speech model to generate speaker independent output (SI output). Training the SD speech model further includes processing the noisy instance of the audio data, along with the speaker embedding, using the SD speech model to generate speaker dependent output (SD output). Training the SD speech model further includes generating a loss based on the SI output and the SD output, and updating one or more portions of the SD model based on the generated loss.

These and other implementations of the technology disclosed herein can include one or more of the following features.

In some implementations, training the SD speech model based on the trained SI speech model further includes: identifying an instance of additional audio data that captures one or more additional spoken utterances of an additional target user; determining an additional speaker embedding for the additional target user; generating a noisy instance of the additional audio data by combining the instance of additional audio data with one or more additional sounds that are not from the additional target user; processing the instance of additional audio data using the SI speech model to generate additional speaker independent output (additional SI output); processing the noisy instance of the additional audio data, along with the additional speaker embedding, using the SD speech model to generate an additional speaker dependent output (additional SD output); generating an additional loss based on the additional SI output and the additional SD output; and updating the one or more portions of the SD speech model based on the generated additional loss.

In some implementations, the method further includes, after training the SD speech model, causing the SD speech model to be stored in local storage of a given client device and to be deployed at the given client device. In response to the SD speech model being stored in the local storage and deployed at the given client device, the given client device performs one or more actions based on processing, using the trained SD speech model, a local instance of audio data along with a local speaker embedding. The local speaker embedding corresponds to a distinct user associated with the client device. In some versions of those implementations, the SI speech model is a speaker independent voice activity detection model, the SD speech model is a speaker dependent voice activity detection model (SD VAD model), and the method further includes: detecting, at the client device, the local instance of audio data; processing, at the client device and using the SD VAD model, the local instance of audio data along with the local speaker embedding to generate output indicating whether the audio data comprises voice activity of the distinct user; and performing the one or more actions in response to determining the audio data comprises voice activity of the distinct user. For example, performing the one or more actions can include processing the local instance of audio data using an additional speech model, such as a hotword detection model and/or an automatic speech recognition engine model. In some other versions of those implementations, the SI speech model is a speaker independent automatic speech recognition model, the SD speech model is a speaker dependent automatic speech recognition model (SD ASR model), and the method further includes: detecting, at the client device, the local instance of audio data; processing, at the client device and using the SD ASR model, the local instance of audio data along with the local speaker embedding to generate output indicative of recognized text for only the one or more spoken utterances of the distinct user; and performing the one or more actions based on the recognized text indicated by the output. In yet other versions of those implementations, the SI speech model is a speech independent hotword detection model, the SD speech model is a speaker dependent hotword detection model (SD hotword detection model), and the method further includes: detecting, at the client device, the local instance of audio data; processing, at the client device and using the SD hotword detection model, the local instance of audio data along with the speaker embedding to generate output indicating whether the audio data comprises a hotword spoken by the distinct user; and performing the one or more actions in response to determining the audio data comprises the hotword spoken by the distinct user. For example, performing the one or more actions can include processing the local instance of audio data using an additional speech model, such as a voice activity detection model and/or an automatic speech recognition model.

In some implementations, the instance of audio data is mapped to a label indicating that the target user corresponds to the instance of audio data that captures the one or more spoken utterances of the target user. In some of those implementations, determining the speaker embedding for the target user includes selecting the speaker embedding for the target user based on the label.

In some implementations, determining the speaker embedding for the target user includes: processing one or more portions of the instance of audio data that captures the one or more spoken utterances of the target user using a speaker embedding model to generate the speaker embedding for the target user.

In some implementations, the one or more additional sounds not from the target user include one or more background noises, and generating the noisy instance of audio data by combining the instance of audio data with the one or more additional sounds not from the target user comprises combining the instance of audio data with the one or more background noises. In some implementations, the one or more additional sounds not from the target user additionally or alternatively include one or more utterances spoken by a user who is not the target user, and generating the noisy instance of audio data by combining the instance of audio data with the one or more additional sounds not from the target user comprises combining the instance of audio data with the one or more utterances spoken by a user who is not the target user.

In some implementations, the trained SI speech model is frozen during the training of the SD speech model.

In some implementations, generating the loss based on the SI output and the SD output comprises generating a cross-entropy loss based on the SI output and the SD output. In some of those implementations, updating the one or more portions of the SD model based on the generated loss includes updating the one or more portions of the SD model based on the cross-entropy loss.

In some implementations, the SD speech model has the same network topology as the SI speech model.

In some implementations, the SD speech model does not have the same network topology as the SI speech model, and wherein the SD speech model topology is more compact than the SI speech model.

In some implementations, a method is provide and includes receiving an instance of audio data that captures one or more spoken utterances of a user of a client device. The instance of audio data is captured using one or more microphones of the client device. The method further includes determining a speaker embedding corresponding to a target user of the client device. The method further includes processing the instance of audio data along with the speaker embedding using a speaker dependent voice activity detection model (SD VAD model) to generate output indicating whether the audio data comprises voice activity that is of the target user of the client device. The SD VAD model is personalizable to any user of the client device. The method further includes performing one or more actions based on the output.

These and other implementations of the technology disclosed herein can include one or more of the following features.

In some implementations, performing the one or more actions based on the output includes: determining, based on the output, whether the audio data includes voice activity that is of the target user; and in response to determining the audio data includes voice activity that is of the target user of the client device, processing the instance of audio data using an additional speech model. In some of those implementations, the additional speech model is a hotword detection model and/or an automatic speech recognition model.

In some implementations, performing the one or more actions based on the output includes: determining, based on the output whether the audio data comprises voice activity that is of the target user; in response to determining the audio data does not comprise voice activity that is of the target user of the client device, determining an additional speaker embedding corresponding to an additional target user of the client device; and processing the instance of audio data along with the additional speaker embedding using the SD VAD model to generate additional output indicating whether the audio data comprises voice activity that is of the additional target user of the client device.

In some implementations, performing the one or more actions based on the output includes: determining, based on the output whether the audio data comprises voice activity that is of the target user; in response to determining the audio data does not comprise voice activity that is of the target user of the client device, discarding the instance of audio data without performing any further processing of the instance of audio data.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving an instance of audio data that captures one or more spoken utterances of a user of a client device, wherein the instance of audio data is captured using one or more microphones of the client device;
   determining a speaker embedding corresponding to a target user of the client device, the speaker embedding being generated based on audio data from the target user;
   processing the instance of audio data along with the speaker embedding using a speaker dependent voice activity detection model (SD VAD model) to generate output indicating whether the audio data comprises voice activity that is of the target user of the client device, wherein the SD VAD model is personalizable to any user of the client device;
   performing one or more actions based on the output, wherein performing the one or more actions based on the output comprises:
      determining, based on the output whether the audio data comprises voice activity that is of the target user;
      in response to determining the audio data does not comprise voice activity that is of the target user:
         determining an additional speaker embedding corresponding to an additional target user of the client device, the additional speaker embedding being generated based on additional audio data from the additional target user; and
         processing the instance of audio data, along with the additional speaker embedding and using the SD VAD model, to generate additional output indicating whether the audio data comprises voice activity that is of the additional target user.

2. The method of claim 1, wherein performing the one or more actions based on the output comprises:
   determining, based on the output, whether the audio data comprises voice activity that is of the target user;
   in response to determining the audio data comprises voice activity that is of the target user:
      processing the instance of audio data using an additional speech model.

3. The method of claim 2, wherein the additional speech model is a hotword detection model.

4. The method of claim 2, wherein the additional speech model is an automatic speech recognition model.

5. A client device comprising:
   one or more microphones;
   memory;
   one or more processors that execute instructions, stored in the memory, to perform a method comprising:
      receiving, via the one or more microphones, an instance of audio data that captures one or more spoken utterances of a user of the client device, wherein the instance of audio data is captured using one or more microphones of the client device;
      determining a speaker embedding corresponding to a target user of the client device, the speaker embedding being generated based on audio data from the target user;
      processing the instance of audio data along with the speaker embedding using a speaker dependent voice activity detection model (SD VAD model) to generate output indicating whether the audio data comprises voice activity that is of the target user of the client device, wherein the SD VAD model is personalizable to any user of the client device;

performing one or more actions based on the output, wherein performing the one or more actions based on the output comprises:
- determining, based on the output whether the audio data comprises voice activity that is of the target user;
- in response to determining the audio data does not comprise voice activity that is of the target user:
  - determining an additional speaker embedding corresponding to an additional target user of the client device, the additional speaker embedding being generated based on additional audio data from the additional target user; and
  - processing the instance of audio data, along with the additional speaker embedding and using the SD VAD model, to generate additional output indicating whether the audio data comprises voice activity that is of the additional target user.

6. The client device of claim 5, wherein performing the one or more actions based on the output comprises:
- determining, based on the output, whether the audio data comprises voice activity that is of the target user;
- in response to determining the audio data comprises voice activity that is of the target user:
  - processing the instance of audio data using an additional speech model.

7. The client device of claim 6, wherein the additional speech model is a hotword detection model.

8. The client device of claim 6, wherein the additional speech model is an automatic speech recognition model.

9. A non-transitory computer-readable storage medium storing instructions executable by one or more processors of a computing system to perform a method comprising:
- receiving an instance of audio data that captures one or more spoken utterances of a user of a client device, wherein the instance of audio data is captured using one or more microphones of the client device;
- determining a speaker embedding corresponding to a target user of the client device, the speaker embedding being generated based on audio data from the target user;
- processing the instance of audio data along with the speaker embedding using a speaker dependent voice activity detection model (SD VAD model) to generate output indicating whether the audio data comprises voice activity that is of the target user of the client device, wherein the SD VAD model is personalizable to any user of the client device;
- performing one or more actions based on the output, wherein performing the one or more actions based on the output comprises:
  - determining, based on the output whether the audio data comprises voice activity that is of the target user;
  - in response to determining the audio data does not comprise voice activity that is of the target user:
    - determining an additional speaker embedding corresponding to an additional target user of the client device, the additional speaker embedding being generated based on additional audio data from the additional target user; and
    - processing the instance of audio data, along with the additional speaker embedding and using the SD VAD model, to generate additional output indicating whether the audio data comprises voice activity that is of the additional target user.

10. The non-transitory computer-readable storage medium of claim 9, wherein performing the one or more actions based on the output comprises:
- determining, based on the output, whether the audio data comprises voice activity that is of the target user;
- in response to determining the audio data comprises voice activity that is of the target user:
  - processing the instance of audio data using an additional speech model.

11. The non-transitory computer-readable storage medium of claim 10, wherein the additional speech model is a hotword detection model.

12. The non-transitory computer-readable storage medium of claim 10, wherein the additional speech model is an automatic speech recognition model.

* * * * *